United States Patent
Montemont (10) Patent No.: US 11,353,599 B2
(45) Date of Patent: Jun. 7, 2022

(54) METHOD FOR TRACKING THE POSITION OF AN IRRADIATING SOURCE

(71) Applicant: Commissariat a l'Energie Atomique et aux Energies Alternatives, Paris (FR)

(72) Inventor: Guillaume Montemont, Grenoble (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 57 days.

(21) Appl. No.: 17/070,977

(22) Filed: Oct. 15, 2020

(65) Prior Publication Data
US 2021/0116584 A1    Apr. 22, 2021

(30) Foreign Application Priority Data

Oct. 16, 2019   (FR) ..................... 19 11567

(51) Int. Cl.
*G01T 1/167*    (2006.01)
*G06T 7/73*    (2017.01)
(Continued)

(52) U.S. Cl.
CPC .............. *G01T 1/167* (2013.01); *G06T 7/337* (2017.01); *G06T 7/38* (2017.01); *G06T 7/74* (2017.01);
(Continued)

(58) Field of Classification Search
CPC ......... G01T 1/1603; G01T 1/167; G01T 7/00; G06T 11/00; G06T 2207/10116;
(Continued)

(56) References Cited

U.S. PATENT DOCUMENTS

2020/0003915 A1* 1/2020 Agramunt Ros ........ G01V 5/02

FOREIGN PATENT DOCUMENTS

CN    103163548 B    1/2016

OTHER PUBLICATIONS

French Preliminary Search Report dated Jul. 2, 2020 in French Application 19 11567 filed on Oct. 16, 2019 (with English Translation of Categories of Cited Documents & Written Opinion), 10 pages.

(Continued)

*Primary Examiner* — Dakshesh D Parikh
(74) *Attorney, Agent, or Firm* — Oblon, McClelland, Maier & Neustadt, L.L.P.

(57) ABSTRACT

Method for producing a reconstruction image, the reconstruction image showing a position of irradiating sources in an environment, the reconstruction image being established on the basis of gamma images acquired by a gamma camera, which is sensitive to ionizing electromagnetic radiation, and movable relative to at least one irradiating source between two different measurement times, the gamma camera being joined to a visible camera, which is configured to form a visible image of the environment, the gamma camera and the visible camera defining an observation field, the method comprising establishing a reconstruction image, showing a position of at least one irradiation source in the observation field, the gamma camera and the visible camera being moved between at least two measurement times.

15 Claims, 4 Drawing Sheets (51) Int. Cl.
*G06T 7/38* (2017.01)
*G06T 7/33* (2017.01)
*G06T 11/00* (2006.01)

(52) U.S. Cl.
CPC ..... *G06T 11/00* (2013.01); *G06T 2207/10116* (2013.01); *G06T 2207/20221* (2013.01)

(58) Field of Classification Search
CPC . G06T 2207/20221; G06T 7/337; G06T 7/38; G06T 7/74
See application file for complete search history.

(56) References Cited

OTHER PUBLICATIONS

Chen et al., "A New Compact Gamma Camera with Super Resolution Capability and High Sensitivity for Monitoring Sparse Radioactive Sources in Large Area", 2013 IEEE Nuclear Science Symposium and Medical Imaging Conference, IEEE, Oct. 27, 2013, 4 pages.

* cited by examiner

METHOD FOR TRACKING THE POSITION OF AN IRRADIATING SOURCE

TECHNICAL FIELD

The technical field of the invention is the characterization of irradiating sources present in an environment, notably in a nuclear installation or an installation comprising irradiating sources.

PRIOR ART

Gamma cameras are devices allowing, using an image, irradiating sources in a given environment, and in particular in nuclear installations, to be mapped. This type of device was developed in the 1990s, and is increasingly used in nuclear installations for the purposes of radiological characterization. The objective is to identify the main irradiating sources present in an installation. Specifically, irradiating sources are not uniformly distributed. They are often concentrated locally, forming "hotspots" to use the term conventionally used in the field of radioprotection. Gamma cameras are advantageous in that they allow these hotspots to be located at distance.

The development and use of gamma cameras have been abundantly described in the literature. Since the start of the 2000s, spectrometric gamma cameras have been under development. These cameras are based on a pixelated imager, each pixel allowing a spectrum to be obtained from the irradiation that it detects. Irradiating sources may be located far more easily as a result. Specifically, the spectrometric function allows energy bands of interest, corresponding to unscattered photons, i.e. photons that have not been deviated since their emission by the irradiation source, to be selected. The path of unscattered photons is straight. Their selection, in predetermined energy bands, allows noise corresponding to scattered photons to be removed. Since the latter photons have been deviated since their remission, they provide no useful information as to the location of the irradiating sources. Scattering is therefore a noise source that may be significantly limited by spectrometry.

Another advantage of spectrometric gamma cameras is that knowledge of the energy of the photons allows the isotopes responsible for the irradiation to be identified. This is information that is important in the field of radioprotection, or in the management of radioactive waste, or even when dismantling nuclear installations, or performing radiological characterization after an accident.

One constraint associated with use of gamma cameras results from the fact that it is impossible to focus X-rays or gamma rays the energy of which exceeds several keV, or even several hundred keV. Thus, the collection efficiency of X-ray or gamma photons is low. Collection efficiency corresponds to a number of photons reaching the detector normalized by the number of photons emitted. Another difficulty is the low detection efficiency of detectors sensitive at such energies, in particular when recourse to compact detectors is privileged. The consequence of the low collection efficiency, combined with a low detection efficiency, is that it is often necessary to acquire an image with a relatively long acquisition time, so as to increase the number of photons detected. It is thus common to keep a gamma camera stationary for several or even several tens of seconds, so as to obtain a sufficient measurement statistic.

Certain developments have been made, allowing a three-dimensional reconstruction of the position of irradiating sources to be generated. It is a question of applying the principles of triangulation, and of taking a plurality of images of the same irradiating sources, while moving the gamma camera between the acquisition of the various images. However, such a method requires high computing powers. In addition, this method does not allow a movement of irradiating source is in a stationary environment to be taken into account.

The inventors have suggested a method that is simple, inexpensive in terms of memory size and of computing power, and that allows a movement of a gamma camera with respect to stationery irradiating sources, or a movement of the irradiating sources with respect to a gamma camera, to be taken into account. The method allows gamma images to be satisfactorily acquired while moving a gamma camera relative to an irradiating source or relative to a plurality of irradiating sources.

SUMMARY OF THE INVENTION

A first subject of the invention is a method for forming a reconstruction image, the reconstruction image showing a position of irradiating sources in an observation field, the method employing a device comprising a gamma camera joined to a visible camera, the device being such that:
  the gamma camera and the visible camera define the observation field;
  the visible camera is configured to form a visible image of the observation field;
  the gamma camera comprises pixels, which are configured to detect ionizing electromagnetic radiation generated by an irradiating source potentially present in the observation field, the pixels lying in a detection plane;
  the gamma camera is configured to form a gamma image, allowing a position, in the field of observation, of irradiating sources, the radiation of which is detected by the pixels, to be estimated;
the method comprising the following iterative steps:
  a) at an initial measurement time, acquiring an initial gamma image with the gamma camera and acquiring an initial visible image with the visible camera;
  b) on the basis of the initial gamma image and of the initial visible image, initializing the reconstruction image;
  c) acquiring a gamma image with the gamma camera and acquiring a visible image with the visible camera, at a measurement time;
  d) comparing the visible image at the measurement time with a visible image at a prior time, the prior time being the initial measurement time or a preceding measurement time, then, depending on the comparison, estimating a field of movement between the visible images acquired at the prior time and at the measurement time, respectively;
  updating the reconstruction image, depending:
  on a reconstruction image established at the prior time;
  on the movement field resulting from step d);
  e) and on the gamma image acquired at the measurement time;
  f) optionally superposing the reconstruction image, or a portion of the reconstruction image, and the visible image;
  g) reiterating steps c) to f) while incrementing the measurement time, until the iterations are stopped;
  the device being moved between at least two measurement times, such that one observation field corresponds to each measurement time.

Thus, the reconstruction image shows a position of the irradiating sources in the observation field. According to one embodiment, the reconstruction image, at a measurement time, is defined only in the observation field corresponding to the measurement time.

Preferably, between at least two measurement times, the device is moved, so that the observation fields before and after the movement respectively comprise a common portion.

The gamma camera defines a gamma observation field. The visible camera defines a visible observation field. The observation field of the device corresponds to an intersection of the gamma observation field and of the visible observation field.

A gamma image allows gamma sources potentially present in the gamma observation field to be located.

According to one preferred embodiment, at each measurement time, each pixel having detected radiation generated by an irradiating source is associated with a position in an object surface lying facing the detection plane, the reconstruction image corresponding to a spatial distribution of the irradiating sources inside the observation field at the measurement time over the object surface. The object surface may advantageously be an object plane, lying parallel to the detection plane, each position being coplanar.

According to this embodiment, the reconstruction image, at the measurement time, is defined only in an intersection between the observation field at the measurement time and the object surface. The reconstruction image, at the measurement time, may be defined only in an intersection between the observation field at the measurement time and the object surface.

Step e) may comprise:
  i) estimating a reconstruction image, at the measurement time, on the basis of the reconstruction image established at the prior time and of the movement field obtained in step d);
  ii) on the basis of the estimated reconstruction image, estimating the gamma image at the measurement time;
  iii) comparing the gamma image estimated at the measurement time and the gamma image acquired at the measurement time;
  iv) depending on the comparison, updating the reconstruction image at the measurement time.

The method may comprise determining a registration function representative of a spatial offset between the gamma camera and the visible camera, the registration function being used in step e). The registration function allows a movement field of the gamma image to be defined on the basis of the movement field resulting from step d). This allows a movement of two gamma images, respectively acquired at the prior time and at the measurement time, to be obtained on the basis of the movement established for two visible images at said times.

Step d) may comprise selecting noteworthy points in the visible images acquired at the prior time and at the measurement time, respectively, the movement field comprising a two-dimensional movement of the selected noteworthy points.

The noteworthy points may preferably be considered to belong to the same surface, or even to the same plane. It may notably be a question of the object surface or of the object plane or of a plane parallel to the object plane.

The method may be such that step d) comprises, at each measurement time:
  extracting first noteworthy points from the visible image acquired at the measurement time;
  extracting second noteworthy points from the visible image acquired at the prior time;
  matching first noteworthy points and second noteworthy points, so as to form pairs of matched points, each pair being formed from a first noteworthy point and from a second noteworthy point;
  for each pair of matched points, determining a movement;
  obtaining the movement field on the basis of the movements determined for each pair of matched points.

The method may comprise:
  generating a first mesh of the observation field, at the measurement time, using first noteworthy points, the latter forming first vertices of the first mesh;
  generating a second mesh of the observation field, at the prior time, using second noteworthy points, the latter forming second vertices of the second mesh;
  depending on the movements determined for various pairs of noteworthy points, determining, by interpolation, movements at points belonging to the first mesh and to the second mesh;
  determining the movement field on the basis of the movement of each matched vertex and of the interpolated movements.

According to one embodiment:
  the device is coupled to a movement sensor, so as to estimate a movement of the device between two successive times;
  step d) takes into account the estimated movement to estimate or validate the movement field.

One aspect of the invention is that the movement field, established using the visible images, is considered to be representative of the movement of the irradiating sources between two measurement times, the registration function making up for any difference.

According to one embodiment, the gamma camera is configured to simultaneously acquire, in steps a) and c), gamma images in various energy bands, steps b) and d) to f) being implemented for each energy band respectively, so as to obtain, at each measurement time, a reconstruction image in various energy bands.

According to one embodiment, the gamma camera is configured to simultaneously acquire, in steps a) and c), gamma images in various energy bands, the method comprising a linear combination of various gamma images respectively acquired, at the same measurement time, in various energy bands, so as to obtain a combined gamma image, steps b) and d) to f) being carried out on the basis of a combined gamma image formed at each measurement time. The combined image may be formed by a weighted sum of gamma images acquired at various energies, the weighted sum using weighting factors, the weighting factors being determined on the basis of an emission spectrum of a radioactive isotope, such that each reconstruction image is representative of a spatial distribution of the activity of the isotope in the observation field corresponding to the measurement time.

Another subject of the invention is a device, comprising:
  a gamma camera, comprising pixels, defining a gamma observation field, the gamma camera being configured to determine a position of sources of X-ray or gamma irradiation in the gamma observation field;
  a visible camera, allowing a visible image of a visible observation field to be formed;
  the intersection of the gamma observation field and of the visible observation field being nonzero, and defining an observation field of the device;

an image-processing unit, configured to receive, at various measurement times:
- a gamma image, formed by the gamma camera;
- a visible image formed by the visible camera;

the processing unit being configured to carry out steps b) and d) to g) of a method according to the first subject of the invention.

The invention will be better understood on reading the description of exemplary embodiments that are described, in the rest of the description, with reference to the figures listed below.

DESCRIPTION OF PARTICULAR EMBODIMENTS

Figure 1A:
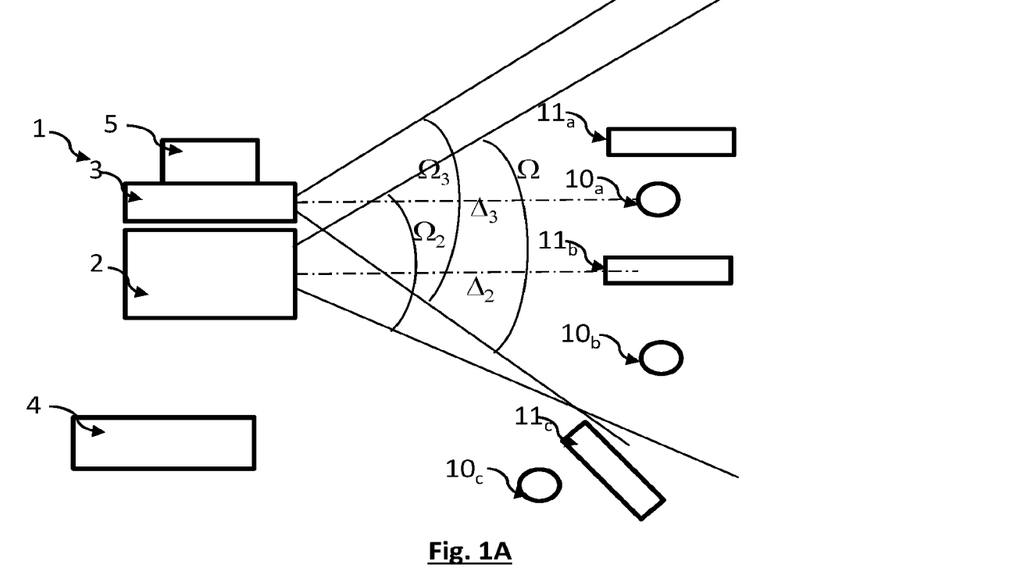
FIG. 1A schematically shows a measuring device placed facing structural elements and irradiating sources.

FIG. 1A shows a measuring device 1 allowing the invention to be implemented. The measuring device comprises a gamma imager 2, or gamma camera. The gamma imager is configured to detect ionizing electromagnetic rays, of X-ray or gamma-ray type, the energy of which is generally comprised between 10 keV and 10 MeV. The gamma imager comprises pixels, each pixel corresponding to an elementary spatial region of the observation field. The pixels lie in a detection plane P. When the elementary spatial region corresponding to a pixel comprises an emitting source of X-ray or gamma radiation, some of the radiation emitted by the source reaches the pixel and is detected by the latter. Thus, the amplitude of the signal of a pixel of the gamma image increases as the elementary spatial region with which it is associated becomes more irradiant, i.e. emits more X-ray or gamma radiation. In the rest of the description, the examples are given in relation to sources of gamma irradiation, this corresponding to the most frequent case of application. It is directly transposable to sources of X-ray irradiation.

The gamma imager may be a Compton gamma camera, a pinhole-collimator gamma camera or coded-aperture gamma camera. It may also be a question, non-exhaustively, of a gamma camera the collimator of which comprises parallel channels, or convergent channels, or divergent channels. Thus, the term gamma camera corresponds to an imager having an observation field and configured to form an image allowing irradiation sources to be located in the irradiation field. Whatever the type of gamma imager, it allows a gamma image comprising pixels, each pixel corresponding to one elementary spatial region of the observed environment, to be formed. Certain gamma imagers have a spectrometric function, in the sense that they allow radiation detected in various spectral bands to be spectrally separated. When this type of imager is used, it is possible to form various gamma images of a given observation field, each image corresponding to one spectral band. The image may likewise be established by considering a combination of spectral bands, which correspond to the emission spectrum of an isotope. The combination may be a weighted sum. The image is then representative of a spatial distribution of the activity of the isotope in question.

With certain gamma imagers, in particular Compton Gamma cameras or coded-aperture gamma cameras, the image acquired by the imager does not allow the emitting sources in the observation field to be viewed directly. The acquired image undergoes processing, taking into account a response function of the camera, so as to allow a gamma image in which the brightness of each pixel corresponds to the emission intensity of that elementary spatial region of the observation field which is associated with the pixel to be obtained.

It is conventional for gamma cameras to be associated with visible cameras. These are standard cameras, allowing a visible image of the observation field to be formed. The device shown in FIG. 1A comprises a visible camera 3, which is securely fastened to the gamma camera 2. The visible camera 3 and the gamma camera 2 each have an observation field, extending about their respective optical axes. In FIG. 1A, the optical axes and observation fields of the gamma camera 2 and of the visible camera 3 are denoted $\Omega_2$, $\Delta_2$, $\Omega_3$ and $\Delta_3$. Generally, the visible observation field is larger than the gamma observation field. The visible and gamma observation fields overlap: their intersection is non-zero. The latter is as large as possible.

The visible camera 3 is usually placed at a small distance from the gamma camera, such that their respective optical axes are close together, and preferably parallel to each other. Thus, beyond a certain distance, generally smaller than 1 m, or even than 50 cm, the observation field of the gamma camera is included in the observation field of the visible camera. The intersection of the two observation fields forms the observation field $\Omega$ of the device.

Preferably, the optical axes of the gamma camera 2 and of the visible camera 3 are aligned. The gamma camera and the visible camera are calibrated to correct a parallax error due to the offset of the two optical axes, and to take into account geometric distortions due to the lenses of the visible camera, in particular at the field edge. The calibration also takes into account a difference in the number and size of pixels between the visible camera and gamma camera. The calibration allows a registration function g to be defined.

A processing unit 4 receives the images generated by the gamma camera 2 and the visible camera 3. The image-processing unit is notably configured to merge the images obtained from the visible camera 3 and the images obtained from the gamma camera 2, notably by taking into account the registration function. The objective is to obtain a composite image corresponding to the visible image, but on which the irradiating sources detected by the gamma camera appear. The processing unit 4 is connected to a memory in which image-processing instructions are coded. The processing unit 4 comprises a processor, a microprocessor for example, configured to implement instructions corresponding to the steps described below.

As mentioned in relation to the prior art, the acquisition time of a gamma image is generally several seconds, or even several tens of seconds. This is due to the low collection efficiency combined with the low detection efficiency.

Figure 1B:
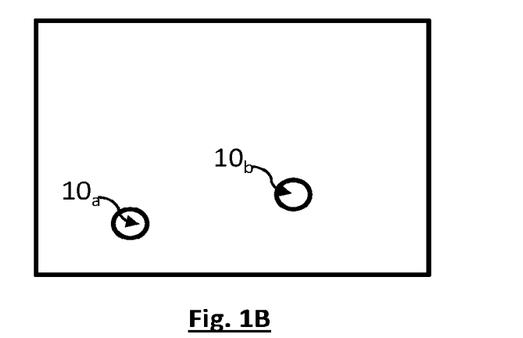
FIGS. 1B and 1C show gamma images and visible images acquired at one measurement time, respectively.
Figure 1C:
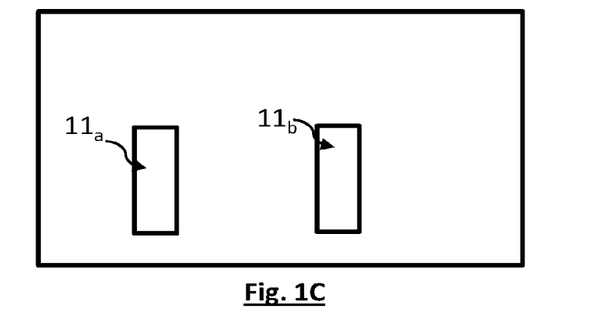

FIG. 1A shows irradiating sources $10_a$, $10_b$ and $10_c$, which are emitting sources of γ radiation, and structural elements $11_a$, $11_b$ and $11_c$ schematically representing the visible environment around the irradiating sources. The device 1 occupies a position and has an orientation in the observed environment. FIG. 1B schematically shows a gamma image obtained by the gamma camera. In said image, by way of illustration, the irradiating sources 10a and 10b present in the observation field have been represented in the form of circles. FIG. 1C schematically shows a visible image obtained with the visible camera, and allowing objects present in the observation field to be observed. The term object corresponds to structural elements present in the observation field. It may be a question of portions of architectural elements (walls, doors, windows, ridges) and/or of portions of industrial installations (pipes, specific pieces of equipment) and/or of items of furniture (table, chair, chest, various items).

Figure 2A:
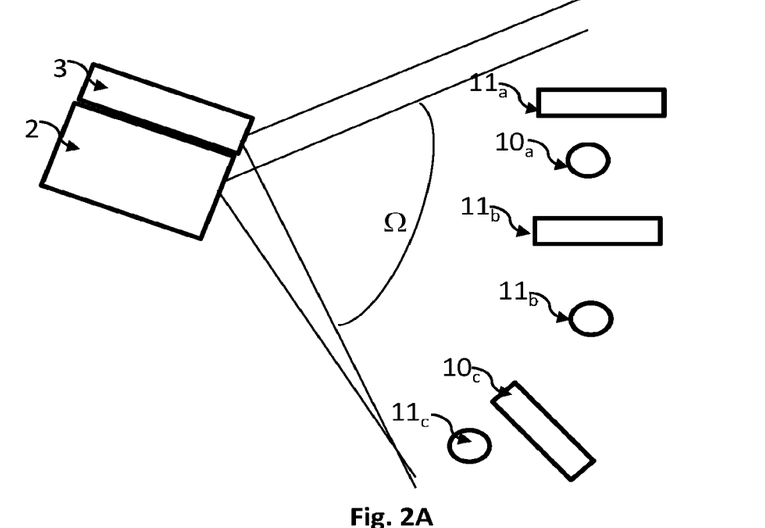
FIG. 2A schematically shows a measuring device placed facing structural elements and irradiating sources, at another measurement time.

FIG. 2A shows the device, in the same environment, in a different position and with a different orientation to those shown in FIG. 1A. Generally, because of the sensitivity of the gamma camera, several seconds, or even minutes, of acquisition are required to obtain a representation of each irradiating source with a sufficient signal-to-noise ratio. During the acquisition of a gamma image, the gamma camera must preferably be held stationary.

Figure 2B:
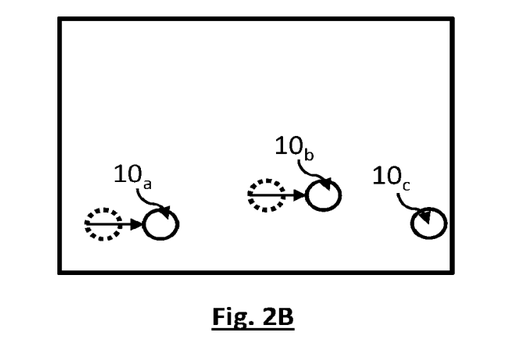
FIGS. 2B and 2C show gamma images and visible images acquired at the other measurement time, respectively.
Figure 2C:
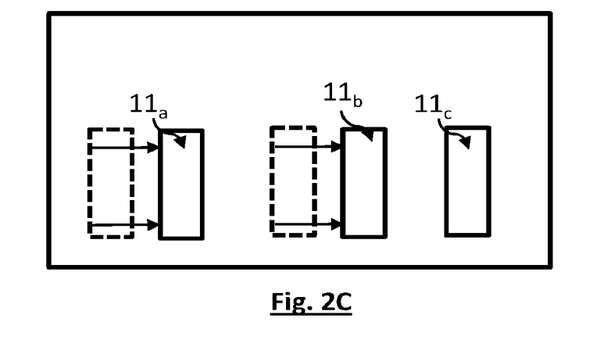

FIG. 2B shows an obtained gamma image. The circles drawn with solid lines show the irradiating sources $10_a$, $10_b$ and $10_c$. In this image, the dashed lines show the positions of the irradiating sources 10a and 10b such as they appear in FIG. 2B. In the gamma image, the change in orientation of the gamma camera between FIGS. 2A and 2B has resulted in a movement of the irradiating sources, this movement being illustrated by two arrows. It is possible to take into account an environment, in which each irradiating source detected by the gamma camera has a fixed position, represented by two-dimensional coordinates in an object space. When the gamma camera is moved in the object space, the gamma sources present in the observation field are detected and produce an exploitable signal in the gamma image. Generally, the signal formed in the gamma image has a relatively low signal-to-noise ratio, the latter depending on the level of irradiation produced by the source on the gamma camera. In order to improve the signal-to-noise ratio, the signal produced by an irradiating source on a gamma camera may be accumulated, for example via a moving average. Thus, each time a gamma source is present in the observation field, the signal that it generates in the gamma image is taken into account, so as to improve the detection statistic associated with the source. The gamma image is then integrated into a reconstruction method, taking into account gamma images acquired beforehand and/or subsequently.

A visible image acquired by the visible camera is associated with each acquisition of a gamma image. The visible camera 3 acquires a visible image of the observed scene. The observation field Ω of the imaging device, i.e. at the intersection of the respective observation fields of the gamma camera and of the visible camera, defines an object space. The object space contains points (x, y), each point being associated with one pixel (u, v) of the gamma image. The pixels belong to a detection plane P, in which the gamma image is formed. The points (x, y) of the observation field have two-dimensional coordinates, and correspond to pixels of the visible image, after the registration function has been taken into account.

Figure 3:
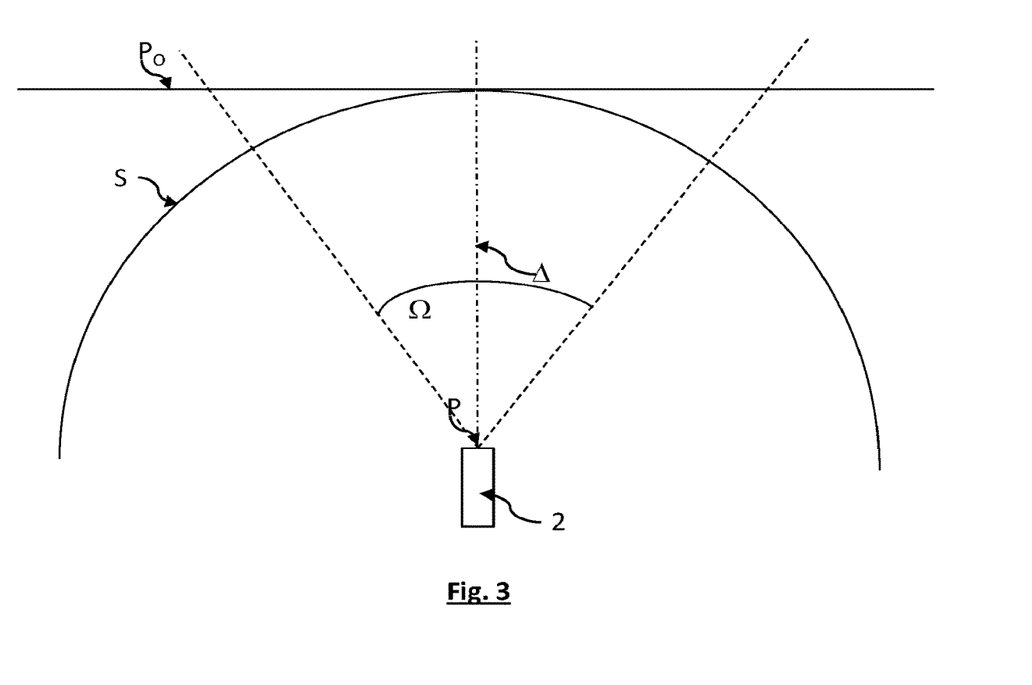
FIG. 3 schematically shows the object plane with respect to the gamma camera.

An important element of the invention is that the points of the object frame of reference are considered to belong to the same object projection plane $P_O$. The angular observation field $\Omega_2$ of the gamma camera, which extends about the optical axis $\Delta_2$, describes a segment of a sphere S (see FIG. 3). The object plane $P_O$ corresponds to a plane, tangent to the sphere S, and perpendicular to the optical axis $\Delta_2$. The irradiating sources present in the observation field are considered to be coplanar and to belong to the object plane. The distance between the detection plane and the object plane is an arbitrary distance, which may not be known. It is not taken into account in the reconstruction method described below. According to one variant, the irradiating sources are considered to belong to the same three-dimensional surface, lying facing the detection plane P.

After image processing, allowing an image merger to be performed (thresholding and/or superposition with one image visible through the other), and taking into account the registration function, the irradiation levels associated with the points in the object frame of reference, and that are considered to be significant, are superposed on the visible image $V_k$ in the form of a colour code.

Thus, the observation field Ω of the device bounds a portion of the object plane, in which portion the reconstruction is performed.

The correspondence between each point (x, y) of the object plane $P_O$ and each pixel (u, v) of the gamma image depends on a spatial response function of the gamma camera. When gamma photons are emitted from a point (x, y) of the object frame of reference, toward the gamma camera, the trace that they form in the gamma image results from a spatial response function F of the camera. When a gamma camera based on a pinhole collimator is employed, the spatial response function takes into account the aperture of the pinhole. It may be approximated by an image of an irradiating source centred in the field of observation, which is used by way of impulse response. When a coded-aperture gamma camera is employed, the response function takes into account the geometry of the mask. When a Compton gamma camera is employed, the response function depends on the detected energy and on the position of pixels having detected radiation, in the detection plane P. Thus, in a Compton gamma camera, the response function may vary at each measurement time.

The correspondence between a point in the observation field and a pixel of the gamma image may for example be determined via a convolution product of the gamma image and the response function (notably in the case of a gamma camera equipped with a pinhole collimator), or via a rectilinear projection (notably in the case of a gamma camera equipped with a coded-aperture collimator). The projection may also be of another type, for example, and nonlimitingly, stereographic or orthographic.

Thus, the response function F makes it possible to pass from the detection plane, in which the gamma image is acquired, to the object plane $P_O$, which corresponds to the observed scene, and in which the position of irradiating sources is sought. In the rest of the description, the notation F corresponds to a projection of an image formed in the object plane toward the detection plane. The notation $F^-$ corresponds to a retroprojection of an image formed in the detection plane P toward the object plane $P_o$. In a first approach, F is a linear operator and $F^-$ corresponds to a transpose of F.

If $M_k$ is a gamma image acquired at a time $t_k$, and $I_k$ is an image showing a reconstruction of the irradiation sources in the field $\Omega_k$ observed at the time $t_k$, the following is obtained:

$$I_k(x, y) = F^-[M_k(u, v)] \quad (1)$$

where:
- (x, y) are coordinates, in the object plane, parallel to the detection plane, and corresponding to coordinates (u, v) in the detection plane;

$I_k(x, y)$ corresponds to an image of the distribution of irradiating sources in the observation field. It is a question of a two-dimensional matrix each term of which represents an emission rate, in a spectral band, or in a plurality of combined spectral bands, of an irradiating source in the object plane, at coordinates (x, y), at the measurement time $t_k$. As described above, when there are a plurality of spectral bands in the emission spectrum of an isotope, the image $I_k$ is representative of a spatial distribution of the activity of the isotope. Generally, $I_k$ corresponds to an estimation of the distribution of the irradiation after at least one gamma image acquired by the gamma camera has been taken into account. Each term of the image $I_k(x, y)$ corresponds to an estimation of an emission rate of gamma (or X-ray) photons, or of an activity, at point (x, y) in the object plane. The size of the image $I_k$ is Nx, Ny, where Nx and Ny designate the number of pixels of the gamma camera along a horizontal axis and a vertical axis, respectively. The size of the matrix $I_k$ is identical to that of a gamma image acquired by the gamma camera.

$F^-$ is a retroprojection operator, allowing passage to the object plane $P_o$ from the detection plane P.

Representing the position of the irradiating sources in a two-dimensional spatial distribution (or map) allows the reconstruction image to be superposed on a visible image acquired by the visible camera, simply.

Figure 4:
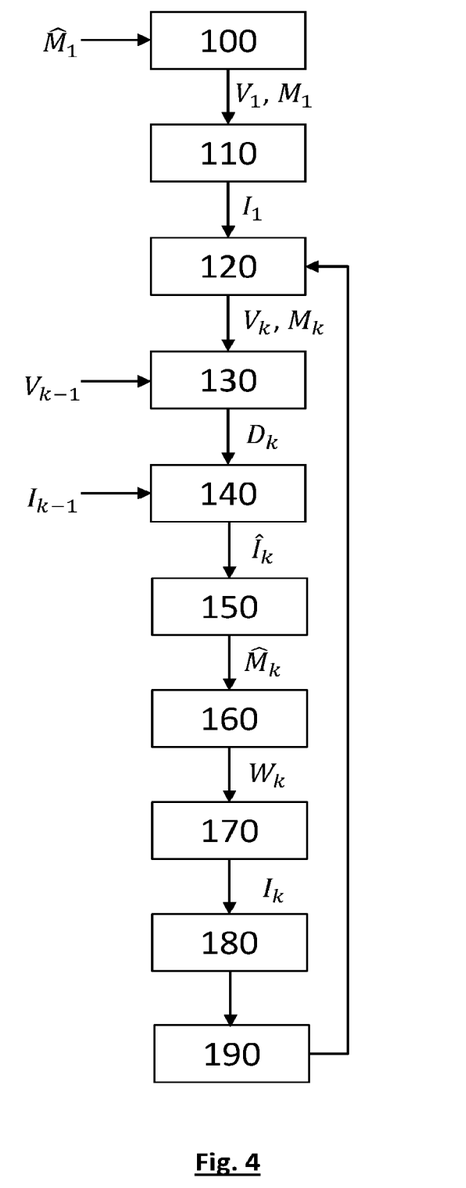
FIG. 4 shows the main steps of a method for obtaining a reconstruction image.

This method, the main steps of which are schematically shown in FIG. 4, allows gamma sources to be located in an environment, while allowing a relative movement of the measuring device 1 with respect to the irradiating sources. Generally, the device 1 is moved with respect to the environment and, during the movement, a plurality of gamma images are acquired. Between two successive acquisitions, the relative movement of the object frame of reference with respect to the device 1 is recorded. The objective is to allow, in the object plane, the position of irradiating sources moving with respect to the measuring device 1 to be tracked. The relative movement may be a movement of the measuring device with respect to an irradiating source, the latter remaining stationary in the environment. It may also be a question of a movement of the irradiating source with respect to the measuring device, the latter remaining stationary in the environment.

Step 100: Initialization

For a first acquisition, the measuring device 1 is placed at a first position, at a first time $t_1$. A gamma image $M_1$ is acquired. Generally, the acquisition time of each gamma image is comprised between 1 ms and 5 s, and preferably comprised between 50 ms and 500 ms, and is for example 100 ms. In the gamma image, each irradiating source present in the field takes the form of a trace, the brightness of which depends on the irradiation, generated by the irradiating source, and detected by the gamma camera.

When the gamma camera is able to perform a spectrometric function, a gamma image is acquired in a given energy spectral band $\Delta E$, or in a combination of energy bands, as described above.

A visible image $V_1$ is acquired at the first time $t_1$, or at a time considered to be consecutive to the first time $t_1$. The main objectives of the initial visible image $V_1$ is to obtain noteworthy points in the observed visible scene. The noteworthy points, and the use made thereof, are described in more detail in relation to step 130.

The gamma image $M_1$ is divided by an estimation image $\hat{M}_1$. The estimation image $\hat{M}_1$ corresponds to an estimation of the gamma image $M_1$. For the first acquisition, the estimation image $\hat{M}_1$ is a predetermined image. It is for example uniform and made up of 1.

The ratio $$U_1 = \frac{M_1}{\hat{M}_1}$$

corresponds to an error term in the measurement with respect to the estimation. The ratio $U_1$ is computed term-by-term, for each pixel (u, v) of the gamma image $M_1$ and of its estimate $\hat{M}_1$.

Step 110: Back-Propagation of the Error and Update of the Reconstruction

The error term $U_1$ is propagated to the object plane, so as to update a reconstruction image $I_1$ such that:

$$W_1(x, y) = F^-[U_1(u, v)] \quad (2)$$

and $$I_1(x, y) = I_0(x, y) \times W_1(x, y) \quad (3)$$

The image $I_0(x, y)$ is a predetermined initialization image that for example contains only real positive numbers, only 1s for example.

Following steps 100 to 110, steps 120 to 190 are carried out iteratively. To each iteration corresponds an iteration rank k. k is an integer comprised between 2 and K. K corresponds to the iteration rank when the iterations are stopped.

Step 120: Acquisition of a Gamma Image $M_k$ and of a Visible Image $V_k$ at a Time $t_k$.

A visible image $V_k$ is acquired at a time $t_k$. A gamma image $M_k$ is also acquired at the time $t_k$, or at an acquisition time considered to be simultaneous with the time $t_k$. Preferably, the acquisition times $M_k$ of each gamma image are identical in each iteration k.

Step 130: Estimation of a Movement Field $D_k$

The objective of this step is to form a movement field $D_k$ representative of a two-dimensional movement of the visible image $V_{k-1}$ with respect to the visible image $V_k$. The image $V_{k-1}$ is a visible image acquired in a preceding iteration or, when k=2, in step 100. The movement field $D_k$ comprises, at various coordinates (x, y) in the object plane, a movement vector $d_k$, corresponding to a movement along the X-axis and a movement along the Y-axis. Each movement vector is a vector of size equal to 2. Thus, only a two-dimensional movement, in a plane parallel to the object plane Po, or coincident with the latter, is taken into account.

The device 1 may have been moved or reoriented between the acquisitions of the images $V_{k-1}$ and $V_k$. Alternatively, certain elements of the object space may have been moved between the two acquisitions. This is notably the case when an irradiating source moves in the object frame of reference.

In each image $V_{k-1}$ and $V_k$, noteworthy points are identified. The noteworthy points are points that are easily identifiable via conventional image processing. It is for example a question of points forming an outline or edge of an object, or of points that are of particularly high contrast from the point of view of brightness or of colour. Thus, a noteworthy point may be a point corresponding to a high Laplacian or brightness gradient.

The number of noteworthy points detected in each image $V_{k-1}$ and $V_k$ is preferably comprised between a few tens and a few hundred or even is more than 1000. The noteworthy points detected in the two images $V_{k-1}$ and $V_k$ form a set $E_{k-1}$ and a set $E_k$, respectively.

The noteworthy points in an image may be detected by implementing an algorithm, for example a Harris corner detector. Following their detection, the noteworthy points are characterized, so as to allow their potential identification in the two images $V_{k-1}$ and $V_k$. The characterization aims to characterize each noteworthy point and its environment. This may be achieved using feature-description algorithms known to those skilled in the art, such as DAISY or LUCID or FREAK. With each noteworthy point is associated a descriptor vector, allowing it to be recognized in the two images $V_{k-1}$ and $V_k$.

On the basis of their description and of their characterization, the noteworthy points identified in the images $V_{k-1}$ and $V_k$ are matched, so as to establish pairs of noteworthy points, each pair associating a noteworthy point of the image $V_{k-1}$ with a noteworthy point of the image $V_k$, the matched noteworthy points having descriptor vectors that are considered to be identical. The matched noteworthy points correspond to the same point of the observed scene, this point appearing in both visible images $V_{k-1}$ and $V_k$.

Preferably, the noteworthy points of each image are considered to be coplanar: they lie in a plane parallel to the object plane.

On the basis of the matched noteworthy points, the images $V_{k-1}$ and $V_k$ are meshed, on the basis of the sets $E_{k-1}$ and $E_k$, respectively. Delaunay mesh generation may be used, this type of mesh generation defining triangular mesh cells, each mesh cell lying between three noteworthy points that are different from one another and matched in the two images $V_{k-1}$ and $V_k$. For each vertex of the mesh, present in both images $V_{k-1}$ and $V_k$, a two-dimensional movement $d_k$ is estimated. For an optimal implementation of the invention, it is preferable for the movement of the device, or of the elements forming the object frame of reference, to be relatively slow, so as to maximize the number of vertices of the mesh present in both images $V_{k-1}$ and $V_k$. A sufficiently slow and fluid movement and a sufficient light level also prevents blurring of the visible image. Preferably, the observation fields before and after a movement overlap by at least 50%, or even at least 80%, or 90%.

An estimation of a movement vector $d_k$ is thus obtained for each vertex of the mesh present in both images $V_{k-1}$ and $V_k$. Since the movement vector is defined only at the vertices present in the images $V_{k-1}$ and $V_k$, an interpolation, for example a linear interpolation, is performed, so as to obtain an estimation of a movement $d_k$ at each point (x, y) of the observation field $\Omega_k$ of the device, at least within the mesh. More precisely, the movement is determined, at least in a mesh established in the intersection of the observation fields $\Omega_{k-1}$ and $\Omega_k$ corresponding to the visible images $V_{k-1}$ and $V_k$ acquired at the measurement times k−1 and k, respectively. The movement field $D_k$ is then formed, each term of which corresponds to the movement vector $d_k(x, y)$ determined at least at each point (x, y) included in the mesh.

The movement field $D_k$, outside the mesh, may be estimated by extrapolation, on the basis of the movement vectors $d_k(x, y)$ established inside the mesh. This allows a movement field vector $D_k$ to be obtained for the entire observation field of the image. In one embodiment, the device comprises a movement sensor 5, allowing an angular movement of the device between the acquisitions of the visible images $V_{k-1}$ and $V_k$ to be estimated. The movement sensor may be a magneto-inertial measurement unit, or comprise at least one gyrometer. In this case, the movement field, outside the mesh, may be estimated by combining the movement field obtained inside the mesh with the movement of the device between the two images.

Other methods allow a movement field $D_k$ between two successive images to be estimated. It may for example be a question of optical-flow methods, which allow a small movement between two successive images to be estimated.

The movement field $D_k$ is at least partially determined by observing a movement of objects present in the visible images $V_{k-1}$ and $V_k$. According to a first possibility, the objects remain stationary in the observed scene: the movement field is established by observing a movement of objects, or portions of objects, present in both images $V_{k-1}$ and $V_k$. In this case, the movement field corresponds to the movement of the camera with respect to the objects present in the observation field of said camera. According to a second possibility, the objects move even though the device has not been moved between the acquisition of the images $V_{k-1}$ and $V_k$. In this case, the movement field $D_k$ corresponds to the movement of the objects relative to the visible camera. More generally, the movement field $D_k$ corresponds to the relative movement of objects, present in the observation field of the visible camera, relative to the latter.

When it is not possible to determine the movement field outside of the mesh, by extrapolation or using movement measurements, the movement field outside the mesh is considered to be uniform, and of constant value—a zero vector may for example be used.

At the end of this step, a movement field $D_k$ of (2, Nx, Ny) size is obtained. At each point (x, y) in question, a field $D_k^{(X)}$ of movement along the X-axis, of (Nx, Ny) size, and a field $D_k^{(Y)}$ of movement along the Y-axis, of (Nx, Ny) size, are established.

Step 140: Estimation of the Reconstruction Image $\hat{I}_k$

On the basis of the reconstruction image $I_{k-1}(x, y)$ resulting from a preceding iteration, or resulting from the initialization, and knowing the movement field $D_k$, a reconstruction image $\hat{I}_k$ is estimated, taking into account the registration function. This step is an important element of the invention.

This step is based on the assumption that the movement of the position of the irradiating sources, in the reconstruction image $I_k$, between the times k−1 and k, may be obtained by considering the movement field $D_k$ measured between two successive visible images associated with the times k−1 and k, respectively, the visible images $V_{k-1}$ and $V_k$ being associated with the gamma images $M_{k-1}$ and $M_k$, respectively.

$$\text{Thus: } \hat{I}_k = (B^* I_{k-1})^{1-\alpha} \times I_{k-1} \cdot g(D_k)^\alpha \tag{4}$$

where:

× is a term-by-term multiplication operator (Hadamard product);

$I_{k-1}$ corresponds to the reconstruction image resulting from a preceding iteration. It is a question of a matrix, the same size as a gamma image $M_k$, and each point of which corresponds to an emission rate, in a given spectral band or in a combination of spectral bands, or to an activity of an isotope.

B is a filter allowing the image $I_{k-1}$ to be smoothed. It may be a low-pass filter, a Gaussian filter for example. The convolution of the image $I_{k-1}$ and the smoothing filter B allows the reconstruction image $I_{k-1}$ to be blurred. Recourse to such a filter allows an a priori on the position of the irradiating sources such as described by the reconstruction image $I_{k-1}$ to be established. According to one alternative, the filtering may be performed according to the expression:

$$\hat{I}_k = B^*[I_{k-1}^{1-\alpha} \times I_{k-1} \cdot g(D_k)^\alpha] \tag{4'}$$

g corresponds to the registration function; $g(D_k)$ is a matrix function taking into account movement in the object plane, while taking into account the registration function g of the visible and gamma cameras.

$I_{k-1} \cdot g(D_k)$ is the reconstruction image $I_{k-1}$ after application of the registered movement vector.

At each point (x, y) in the observation field, $D_k$ allows a movement $D_k^{(X)}(x, y)$ along the X-axis and a movement $D_k^{(Y)}(x, y)$ along the Y-axis to be defined. The matrix function $g(D_k)$ allows a movement, in the object plane, to be established depending on the movement $D_k$. It allows the coordinates $(x_k, y_k)$ at the time k to be estimated depending on coordinates $(x_{k-1}, y_{k-1})$ at the time k−1, such that:

$$x_k = x_{k-1} + g_X[D_k^{(X)}(x, y)] \quad (5.1)$$

$$y_k = y_{k-1} + g_Y[D_k^{(Y)}(x, y)] \quad (5.2)$$

where $g_X$ and $g_Y$ correspond to components of the registration function established along the X-axis and along the Y-axis, respectively.

Thus, $g(D_k)$ is a matrix function allowing passage between $(x_{k-1}, y_{k-1})$ and $(x_k, y_k)$, such as explained by expressions (5.1) and (5.2). It is a question of a change of variables.

The exponent α is strictly positive and strictly lower than 1: 0<α≤1. The exponent α allows a memory effect to be achieved: the closer α gets to 1, the more the memory of preceding gamma-image acquisitions is preserved.

The movement field $D_k$ is established by observing a movement of objects between the visible images $V_{k-1}$ and $V_k$, in the observation field of the visible camera. Thus, the movement of the irradiating sources, in the two reconstruction images $I_{k-1}$ and $\hat{I}_k$ is based on the detection of objects, forming noteworthy points in the visible images $V_{k-1}$ and $V_k$, matching thereof, and the computation of the respective movements thereof between the two visible images. The movement thereof allows a field $D_k$ of movement in the visible image to be established, which is assigned to the gamma image, after application of the registration function.

Thus, to within the registration function, movement of the irradiation sources is considered to be able to be determined from the movement field computed on the basis of the visible images. An important point in the invention is that the movements of objects observed in the visible image are considered to be representative of the movements of the gamma sources, the latter being shown in the reconstruction image. This significantly limits the complexity of the computations and the resources required to perform the computations. The method does not require complex techniques, such as triangulation, to be implemented or a three-dimensional position of the irradiating sources in the environment to be estimated.

Step 150: Estimation of the Gamma Image $\hat{M}_k$ at the Time k

The estimated reconstruction image $\hat{I}_k$, obtained in step 140, is projected into the detection plane, so as to estimate the gamma image $\hat{M}_k$ corresponding to iteration k. The gamma image $\hat{M}_k$ is estimated using the expression $$\hat{M}_k(u, v) = F[\hat{I}_k(x, y)] \quad (6)$$

where F corresponds to a projection operator describing the projection between the object plane $P_o$ and the detection plane P.

Step 160: Determination of an Error Term

In this step, on the basis of the image $M_k$ acquired at the time k, and resulting from step 120, and of the estimation $\hat{M}_k$ resulting from step 140, the measurement error is computed:

$$U_k = \frac{M_k}{\hat{M}_k}. \quad (7)$$

Step 170: Back-Propagation of the Error

The error term $U_k$ is back-propagated to the object plane using the expression:

$$W_k(x, y) = F^-[U_k(u, v)] \quad (8)$$

Step 180: Update of the Reconstruction Image

In this step, the reconstruction image, corresponding to the time k, is updated according to the expression, $$I_k = I_{k-1} \times W_k \quad (9)$$

in which × designates a term-by-term multiplication.

According to one embodiment, a non-linear function h is taken into account, such that $$I_k = I_{k-1} \times h(W_k) \quad (10)$$

Thus, at each measurement time k, the reconstruction image $I_k$ is updated by taking into account the gamma image $M_k$ acquired at the measurement time. The gamma image $M_k$ is taken into account via the back-propagated error $W_k$.

The reconstruction image $I_k$ is defined in an intersection between the object plane $P_O$ and the observation field $\Omega_k$ at the measurement time k. Preferably, the reconstruction image $I_k$ is not defined outside of the observation field $\Omega_k$ at the measurement time k. This allows the reconstruction process to be simplified, by not taking into account irradiation sources potentially present outside of the observation field $\Omega_k$. The reconstruction image then contains only the positions of the irradiating sources present in the observation field at the measurement time k, obtained on the basis of gamma images $M_k$ acquired at the measurement time or of gamma images acquired at prior times, preceding the measurement time. On each movement of the measuring device 1, the spatial extent of the reconstruction image is modified, so as to limit it to the intersection between the object plane $P_O$ and the observation field $\Omega_k$ at the measurement time k.

The reconstruction image may be of a size smaller than or equal to the size of each gamma image.

Step 180: Superposition of the Images.

The reconstruction image $I_k$ is given a certain level of transparency, then is superposed on the visible image $V_k$, the superposition being carried out without taking into account the registration function. This allows a correspondence to be achieved between the objects observed in the visible image and the irradiating sources shown in the reconstruction image.

Step 190:

Reiteration of steps 130 to 190, while incrementing the iteration index k.

According to one embodiment, the device comprises a movement sensor 5, for example an inertial measurement unit. The movement sensor comprises a gyrometer, optionally complemented by an accelerometer and/or a magnetometer. Generally, the movement sensor allows an angular movement between two successive acquisition times to be obtained. Information obtained from the inertial measurement unit may be taken into account in step 130, so as to limit the risk of error in the matching of the noteworthy points. It may also be used to complete the movement field $D_k$ outside of the mesh formed between the matched noteworthy points. The translational movement of the camera and the positioning of the objects may also be estimated using other devices such as LIDAR, GPS positioning systems, fixed radiofrequency beacons or an inertial navigation system.

According to one embodiment, the gamma camera is able to perform a spectrometric function. Steps 100 to 180 are carried out simultaneously, in each energy band ΔE. It is then possible to obtain as many reconstruction images as there are considered energy bands.

Steps 100 to 180 may also be carried out on the basis of gamma images that are respectively acquired in various energy bands, then combined, as described above, so as to take into account an emission spectrum of a radioactive isotope selected beforehand. In this case, the reconstruction image may be likened to a spatial distribution of the activity of the radioactive isotope, in the observation field.

The invention is applicable to various nuclear installations, or, more generally, to operations of seeking for and characterizing radioactive sources.

The invention claimed is:

1. A method for forming a reconstruction image, the reconstruction image showing a position of irradiating sources in an observation field, the method using a device comprising a gamma camera joined to a visible camera, wherein:
   the gamma camera and the visible camera define the observation field;
   the visible camera is configured to form a visible image of the observation field;
   the gamma camera comprises pixels, which are configured to detect ionizing electromagnetic radiation generated by an irradiating source potentially present in the observation field, the pixels lying in a detection plane;
   the gamma camera is configured to form a gamma image, allowing a position, in the field of observation, of irradiating sources, the radiation of which is detected by the pixels, to be estimated;
the method comprising the following iterative steps:
   a) at an initial measurement time, acquiring an initial gamma image with the gamma camera and acquiring an initial visible image with the visible camera;
   b) on the basis of the initial gamma image and of the initial visible image, initializing the reconstruction image;
   c) acquiring a gamma image with the gamma camera and acquiring a visible image with the visible camera, at a measurement time;
   d) comparing the visible image at the measurement time with a visible image at a prior time, the prior time being the initial measurement time or a preceding measurement time, then, depending on the comparison, estimating a field of movement between the visible images acquired at the prior time and the measurement time, respectively;
   e) updating the reconstruction image, using:
      a reconstruction image established at the prior time;
      the movement field resulting from step d);
      and the gamma image acquired at the measurement time;
   f) optionally superposing the reconstruction image, or a portion of the reconstruction image, and the visible image;
   g) reiterating steps c) to f) while incrementing the measurement time, until the iterations are stopped;
wherein the method includes moving the device between at least two measurement times, such that one observation field corresponds to each measurement time.

2. The method according to claim 1, wherein
   at each measurement time, each pixel having detected radiation generated by an irradiating source is associated with a position on an object surface lying facing the detection plane;
   the reconstruction image corresponds to a spatial distribution of the irradiating sources inside the observation field at the measurement time over the object surface.

3. The method according to claim 2, wherein the object surface is an object plane lying parallel to the detection plane, each position within the object surface being coplanar.

4. The method according to claim 1, wherein the reconstruction image, at the measurement time, is defined only in an intersection between the observation field at the measurement time and the object surface.

5. The method according to claim 1, wherein at each measurement time, step e) comprises
   i) estimating a reconstruction image, at the measurement time, using the reconstruction image established at the prior time and of the movement field obtained in step d);
   ii) estimating the gamma image at the measurement time using the estimated reconstruction image;
   iii) comparing the gamma image estimated at the measurement time and the gamma image acquired at the measurement time;
   iv) depending on the comparison, updating the reconstruction image at the measurement time.

6. The method according to claim 1, comprising determining a registration function representative of a spatial offset between the gamma camera and the visible camera, the registration function being used in step e).

7. The method according to claim 1, wherein step d) comprises
   selecting noteworthy points in the visible images acquired at the prior time and at the measurement time, respectively;
   so that the movement field comprises two-dimensional movements of the selected noteworthy points respectively.

8. The method according to claim 7, wherein the noteworthy points are considered to belong to the same surface.

9. The method according to claim 1, wherein step d) comprises:
   extracting first noteworthy points from the visible image acquired at the measurement time;
   extracting second noteworthy points from the visible image acquired at the prior time;
   matching first noteworthy points and second noteworthy points, so as to form pairs of matched points, each pair being formed from a first noteworthy point and from a second noteworthy point;
   for each pair of matched points, determining a movement;
   obtaining the movement field on the basis of the movements determined for each pair of matched points.

10. The method according to claim 9, comprising:
   generating a first mesh of the observation field, at the measurement time, using first noteworthy points, the latter forming first vertices of the first mesh;
   generating a second mesh of the observation field, at the prior time, using second noteworthy points, the latter forming second vertices of the second mesh;
   depending on the movements determined for various pairs of noteworthy points, determining, by interpolation, movements at points belonging to the first mesh and to the second mesh;

obtaining the movement field on the basis of the movement of each matched vertex and of the interpolated movements.

11. The method according to claim 1, wherein:

the device is coupled to a movement sensor, so as to estimate a movement of the device between two successive times;

step d) takes into account the estimated movement to estimate or validate the movement field.

12. The method according to claim 1, wherein the gamma camera is configured to simultaneously acquire, in steps a) and c), gamma images in various energy bands, steps b) and d) to f) being implemented for each energy band respectively, so as to obtain, at each measurement time, a reconstruction image in various energy bands.

13. The method according to claim 1, wherein the gamma camera is configured to simultaneously acquire, in steps a) and c), gamma images in various energy bands, the method comprising a linear combination of various gamma images respectively acquired, at the same measurement time, in various energy bands, so as to obtain a combined gamma image, steps b) and d) to f) being carried out on the basis of a combined gamma image formed at each measurement time.

14. The method according to claim 13, wherein a combined image is formed by a weighted sum of gamma images acquired at various energies, the weighted sum using weighting factors, the weighting factors being determined on the basis of an emission spectrum of a radioactive isotope, such that each reconstruction image is representative of a spatial distribution of the activity of the isotope in the observation field corresponding to the measurement time.

15. A device, comprising:

a gamma camera, comprising pixels, defining a gamma observation field, the gamma camera being configured to determine a position of sources of X-ray or gamma irradiation in the gamma observation field;

a visible camera, allowing a visible image of a visible observation field to be formed;

the intersection of the gamma observation field and of the visible observation field being nonzero, and defining an observation field of the device;

a processing unit, configured to receive, at various measurement times:

a gamma image, formed by the gamma camera;

a visible image formed by the visible camera;

wherein the processing unit is configured to carry out steps b) and d) to g) of the method according to claim 1.

* * * * *